Patented Mar. 19, 1946

2,396,718

UNITED STATES PATENT OFFICE 2,396,718

EMULSIFICATION OF VEGETABLE AND ANIMAL OILS

Abraham Moscowitz, Nutley, N. J., assignor to L. Sonneborn Sons, Inc., a corporation of Delaware No Drawing. Application December 13, 1941,
Serial No. 422,883

8 Claims. (Cl. 252—312)

This invention relates to new and useful improvements in the emulsification of vegetable and animal oils.

Animal and vegetable oils and blends of such oils with mineral oil as they are for instance used in the processing of textile materials as lubricants, are commonly employed in the form of their aqueous emulsions. Satisfactory emulsification of these oils by means of mahogany sulphonates is difficult to obtain because mahogany sulphonate alone is normally incapable of dispersing these oils in aqueous media, i. e., incapable of reducing the oil particles to a sufficiently fine particle size so as to substantially remain in suspension and to thus offer an effective surface to the materials to be treated therewith.

I have discovered a composition of matter which, when blended with an oil of animal or vegetable origin or with a compound containing such oil and mineral oil will yield a product instantaneously emulsifiable in aqueous media, producing emulsions in which the dispersed particles are sufficiently small to render these emulsions substantially stable in character.

The composition in accordance with the instant invention broadly comprises a petroleum mahogany soap, a metal oleate free oleic acid and a polyhydric alcohol or polyhydric monoether.

The petroleum mahogany sulphonate in accordance with my invention is the product commonly known as such and obtained in the form of its free acid as the oil soluble sulphonic product in the exhaustive acid refining of petroleum oil distillates. The alkali metal salts, such as sodium or potassium salts of the petroleum mahogany sulphonic acids are preferred within the scope of my invention. For best results, it is of advantage to use from 63% to 74%, and preferably from 67% to 70% of the petroleum mahogany sulphonic acid soap by weight of the total composition.

The oleic acid soap useful in accordance with the invention should be one predominantly water soluble and preferably an alkali metal oleate such as potassium or sodium oleate. In most cases, I find it of advantage in the compounding of my novel product to add free oleic acid and neutralize between 60% and 68% of the same with a caustic solution of satisfactory strength such as a 45% KOH solution. In such case, I prefer to add 11% to 15% and preferably 13% to 14% free oleic acid and sufficient amounts of a 45% KOH solution to leave from 40% to 32% of the free oleic acid. This degree of neutralization, as a rule, is accomplished by 3% to 5% and preferably 3% to 4% of the caustic potash. In all cases, it is recommended that the composition in accordance with the invention possess a water content of from 1% to 6% and preferably 5%, part of the water within the preferred practice being introduced by way of the caustic potash solution.

The specification as to water content of 1% to 6% includes not only the water entering the composition through the caustic solution but also the water of neutralization and water content of the mahogany sulphonate.

The polyhydric alcohols or their mono-ethers that I have found useful in accordance with the invention may, for instance, comprise ethylene glycol, diethylene glycol, ethylene glycol monoethyl ether, ethylene glycol mono-butyl ether, diethylene glycol mono-ethyl ether, diethylene glycol monobutyl ether. As a rule 12% to 14% and preferably 13% to 14% of the polyhydric alcohol or polyhydric monoether may be used. In accordance with the preferred composition of my invention, I find it of advantage to incorporate diethylene glycol in my novel composition.

The composition in accordance with the present invention broadly comprises from 63 to 74%, and preferably from 67 to 70% by weight, alkali metal petroleum mahogany sulphonate, 9 to 11% by weight predominantly water soluble metal oleate, 4 to 6% by weight free oleic acid, 12 to 14%, and preferably 13 to 14% by weight, of at least one member selected from the group consisting of glycols and glycol monoethers, and not appreciably more than 6% by weight of water. The necessary amount of metal oleate and free oleic acid may be obtained by the addition of 11 to 15% by weight of free oleic acid and partial neutralization thereof by means of an aqueous alkali in amount sufficient to leave from 32 to 40% by weight of said oleic acid in free condition and of such concentration as to impart to the composition a water content not substantially in excess of 6% by weight, preferably 3 to 4% by weight of a 45% KOH solution.

The following example is furnished by way of illustration but not of limitation to exemplify the composition in accordance with the invention:

Example

| | Per cent |
|---|---|
| Petroleum mahogany soap | 69.4 |
| Oleic acid | 13.4 |
| Diethylene glycol | 13.3 |
| 45% aqueous KOH | 3.9 |

The above stated proportions will produce a composition which analyzes as follows:

| | Per cent |
|---|---|
| Petroleum mahogany soap | 69.4 |
| Oleic acid | 4.5 |
| K oleate | 10.1 |
| Water | 2.7 |
| Diethylene glycol | 13.3 |

In the practical operation of my invention, a composition as herein set forth and as for instance typified by the foregoing example is blended with a suitable animal or vegetable oil or, with a compound containing such oil and mineral oil, in a ratio of from 1:3 to 1:5 and preferably 1:4. Conventional oils of animal or vegetable origin within the scope of my invention, are, for instance, lard oil, neat's-foot oil, olive oil, grape seed oil, coconut oil, tea seed oil, corn oil, rice oil, avocado oil, sesame oil, cotton seed oil, and other similar oils.

The blends of oils of animal and vegetable origin with the composition in accordance with the invention are instantaneously emulsifiable in aqueous media forming finest substantially stable dispersions of a particle size offering an effective contact surface to, for instance, textile material to be treated therewith.

The aqueous emulsions obtained from the blends of the herein specified compositions with an oil of animal or vegetable origin essentially constitute two phase systems in which the internal phase predominantly consists of the oil.

The foregoing description is for purposes of illustration and not of limitation and it is, therefore, my intention that the invention be limited only by the appended claims or their equivalents in which I have endeavored to claim all inherent novelty.

I claim:

1. A composition of matter for blending with oils selected from the group consisting of animal and vegetable oils and blends of such oils with mineral oils to form substantially instantaneously emulsifiable products, which comprises 63 to 74% by weight alkali metal petroleum mahogany sulfonate, 9 to 11% by weight alkali metal oleate, 4 to 6% by weight free oleic acid, 12 to 14% by weight of at least one member selected from the group consisting of glycols and glycol monoalkyl ethers, and 1 to 6% by weight of water.

2. A composition of matter in accordance with claim 1 in which said last mentioned group member is diethylene glycol monobutyl ether.

3. A composition of matter in accordance with claim 1 in which said last mentioned group member is diethylene glycol monoethyl ether.

4. A composition of matter for blending with oils selected from the group consisting of animal and vegetable oils and blends of such oils with mineral oils to form substantially instantaneously emulsifiable products, which comprises 63 to 74% by weight of alkali metal petroleum mahogany sulfonate, 11 to 15% by weight of partly neutralized oleic acid, 12 to 14% by weight of diethylene glycol, and 3 to 4% by weight of a 45% aqueous caustic potash solution partly consumed in the neutralization of said oleic acid.

5. A composition of matter in accordance with claim 4 in which said mahogany sulfonate is present in amount from 67 to 70% by weight, said oleic acid from 13 to 14% by weight, and said diethylene glycol from 13 to 14% by weight.

6. A composition of matter yielding substantially instantaneous aqueous emulsions comprising an oil selected from the group consisting of animal oils and vegetable oils and blends of such oils with mineral oils blended in a ratio by volume of between 3:1 to 5:1 with a composition comprising 63 to 74% by weight of alkali metal petroleum mahogany sulfonate, 9 to 11% by weight of alkali metal oleate, 4 to 6% by weight of free oleic acid, 12 to 14% by weight of at least one member selected from the group consisting of glycols and glycol monoalkyl ethers, and 1 to 6% by weight of water.

7. A composition of matter in accordance with claim 6 in which said last mentioned group member is diethylene glycol monobutyl ether.

8. A composition of matter in accordance with claim 6 in which said last mentioned group member is diethylene glycol monoethyl ether.

ABRAHAM MOSCOWITZ.